April 26, 1966 P. W. NICHOLS 3,248,069
SELF-WINDING INERTIA ACTUATED BELT STORAGE REEL
Filed May 7, 1965 2 Sheets-Sheet 2

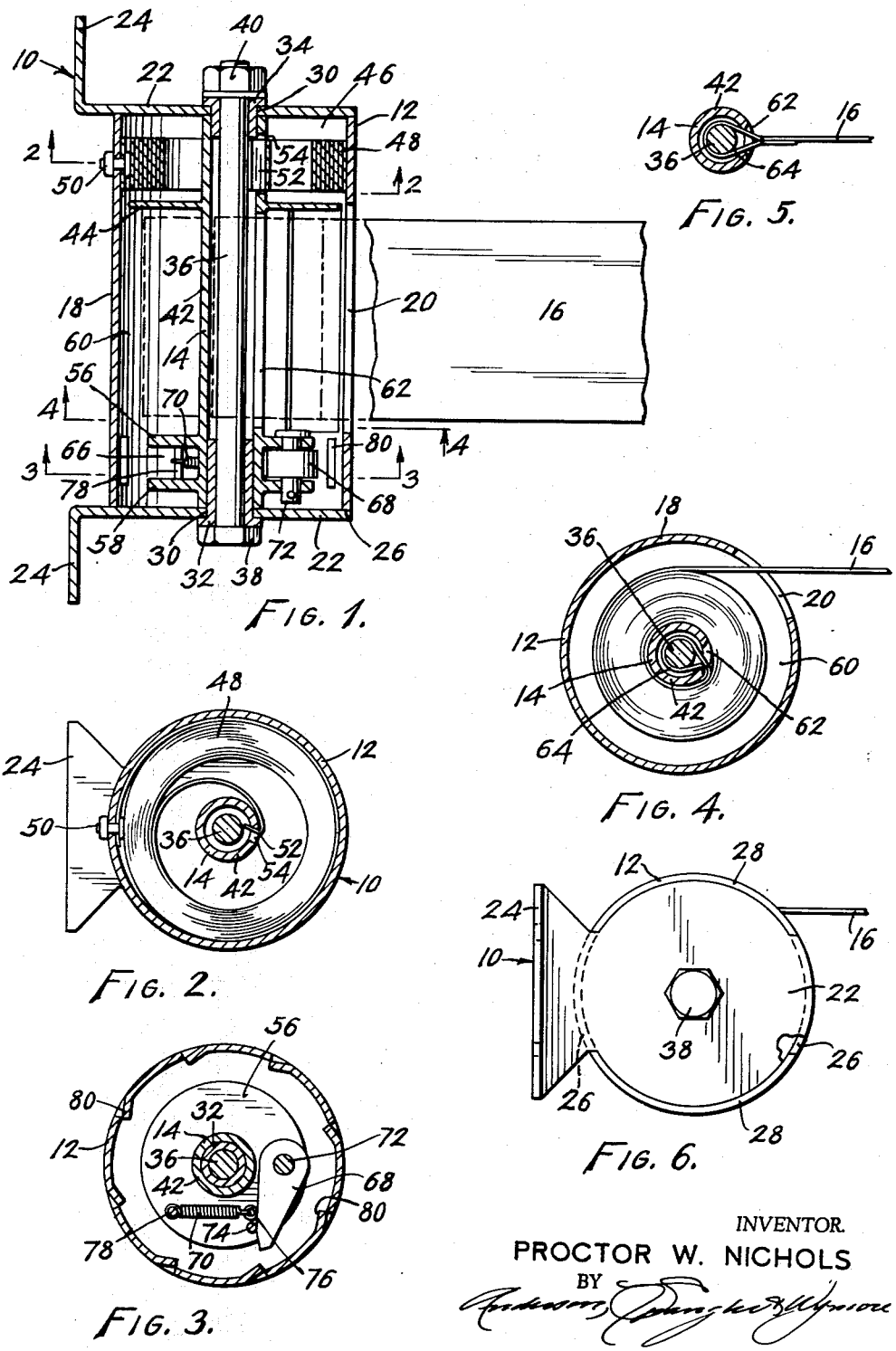

INVENTOR.
PROCTOR W. NICHOLS
BY

United States Patent Office 3,248,069
Patented Apr. 26, 1966

3,248,069
SELF-WINDING INERTIA ACTUATED
BELT STORAGE REEL
Proctor W. Nichols, Colorado Springs, Colo., assignor to Aircraft Mechanics, Inc., Colorado Springs, Colo., a corporation of Colorado
Filed May 7, 1965, Ser. No. 454,156
6 Claims. (Cl. 242—107.4)

This application includes subject matter in common with and is a continuation-in-part of my co-pending application for U.S. Letters Patent Serial No. 259,549 filed February 19, 1963, for "Self-Winding Inertia Activated Belt Storage Reel."

This invention relates to reeling devices and, more particularly, to inertia-actuated reels of a type upon which a belt or strap is stored.

For many years now, inertia-actuated reeling devices have been employed in military aircraft as a means for storing the safety harness or lap belts and, more important, as a device which will enable the user to move freely within his seat while performing his duties yet, at the same time, restrain his body against injury resulting from instantaneous shock loads of the nature brought about by a crash or similar difficulty. There is also a considerable movement afoot to equip automobiles with safety harnesses in the nature of lap belts, shoulder belts and the like in order to prevent injury to the driver and his passengers resulting from accidents of one type or another. Most automobile seat belts, however, have no take-up mechanism associated therewith but are merely fastened to the floor or some other structural member of the vehicle with brackets. As a result, the belts are strung about on the seats when not in use, or, as is often the case, they fall down behind the seat where they are difficult to retrieve when needed. Furthermore, in the absence of a take-up mechanism, the length of the belts is frequently suited to only a particular user and must be adjusted for use by other occupants. This is seldom done and the wearer ends up by sacrificing much of the protection which the belt could afford by wearing it too loose.

The aforementioned problems associated with the usual automobile seat belt could, in large measure, be solved by winding the belts on a spring-wound inertia-actuated reel mechanism having the same general characteristics present in the aircraft inertia reels previously mentioned. While it is true that many, if not most, of the aircraft inertia reels would perform the desired functions admirably, they are far too complicated and costly to use in the average automobile especially when it is considered that anywhere from one to six and perhaps even twelve would be needed for a six-passenger car.

In accordance with the teaching of the instant invention, on the other hand, a considerably simplified and less costly inertia reel has ben developed which answers the requirement of the automotive industry admirably in that it includes an automatic take-up feature which stores the belt when not in use and, at the same time, adjusts the length thereof to suit the requirements of the individual user. In addition, it permits free movement of the passenger or driver under normal conditions yet locks the belt against further pay-off from the reel upon the application of any instantaneous shock load. These desirable ends are accomplished by means of a simplified case construction that presents stamped stop-forming ratchet teeth engageable by a spring-restrained centrifugally-operated pawl carried by the spool.

It is, therefore, the principal object of the present invention to provide a novel, improved and considerably simplified inertia reel.

A second object is the provision of a unit of the type aforementioned that is ideally suited for use in automotive vehicles although it will satisfy the requirements of many military and most commercial aircraft.

Another objective of the invention herein claimed is the provision of an inertia-actuated reel which will store the belting and automatically remove any slack therein.

Still another object is to provide a spring-wound take-up reel that is self-acting to adjust to the needs of the individual user.

An additional objective of this invention is the provision of means for effectively restraining a person against injury resulting from instantaneous shock or impact loads while, at the same time, allowing more or less unrestricted freedom of movement under ordinary conditions.

Further objects are the provision of an inertia-actuated reel that is quite inexpensive, compact, versatile, easy to make and service, rugged, and decorative in appearance.

Still a further object of this invention is the provision of a dual inertia-actuated locking means for additional safety.

Other objects will be in part apparent and in part pointed out specifically hereinafter in connection with the description of the drawings that follows, and in which:

FIGURE 1 is a diametrical section showing one embodiment of the inertia reel of the present invention with portions of the belt broken away to better reveal the spool construction;

FIGURE 2 is a transverse section taken along line 2—2 of FIGURE 1 showing spiral torsion spring that constantly tensions the belt in a direction to wind same onto the spool;

FIGURE 3 is a transverse section taken along line 3—3 of FIGURE 1 showing the details of the centrifugally-actuated pawl and associated ratchet teeth;

FIGURE 4 is a transverse section taken along line 4—4 of FIGURE 1 showing the manner in which the belt is wound on the spool;

FIGURE 5 is fragmentary transverse section similar to FIGURE 4 showing the manner in which the belt is secured to the hub of the spool; and, FIGURE 6 is an end view of the case showing how the end plates are attached thereto, portions having been broken away to better reveal the construction.

Figure 7:
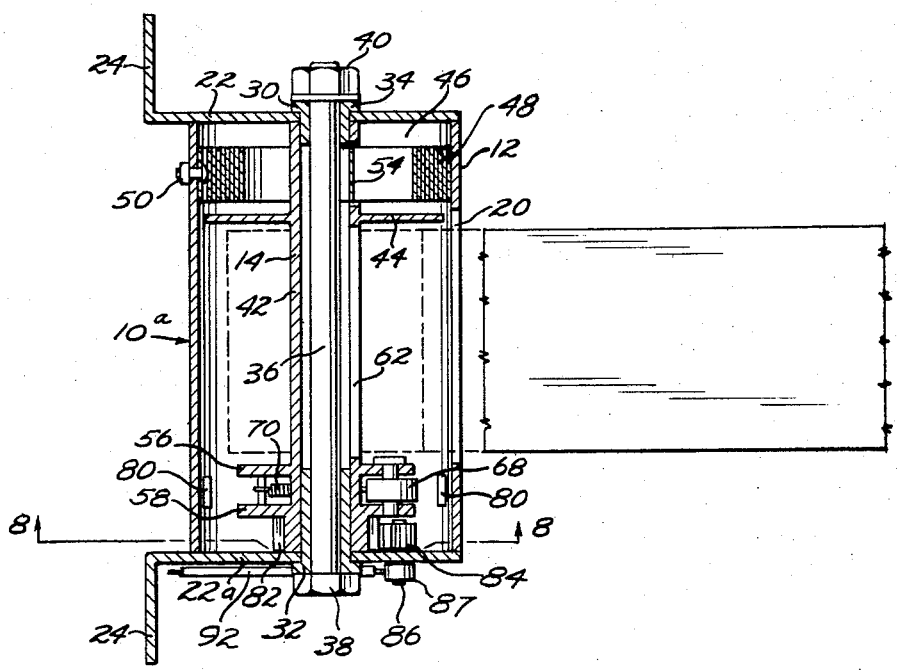
FIGURE 7 is a diametrical section showing another embodiment of the inertia reel of the present invention.

Referring now to the drawings for a detailed description of the present invention and, initially, to FIGURES 1 and 6 for this purpose, the reel which has been designated in a general way by reference numeral 10 will be seen to include a case 12 within which is journalled for rotation a spool 14 that stores belt 16. The portion of the case 12 enclosing the spool consists of an open-ended hollow cylindrical housing 18 having an elongate slot 20 in the wall thereof intermediate its ends positioned and proportioned to pass the belt. The ends of this tubular spool housing are closed by identical end plates 22 that are generally circular except for L-shaped mounting feet 24 that project from the periphery thereof and provide a base. In the particular form shown, segments 26 at the ends of the spool housing are recessed the thickness of the end plates while adjoining segments 28 on the peripheral edge of the latter elements are cut-away to form an interlocking assembly that is most clearly revealed in FIGURE 6. By so doing, the end plates are prevented from rotating relative to the spool housing and end plates are secured in fixed relationship to one another so that their feet 24 are in position for attachment to a planar support. Each end plate has a central opening 30 therein that accepts a flanged bushing 32 or 34. These bushings, in turn, receive an axle 36 which has a head 38 at one end and a nut 40 at the other. With the axle in place as shown in FIGURE 1, the end plates are secured to the ends of the spool housing completing the case 12.

Next, with reference to FIGURES 1 through 5 inclusive, it will be seen that the spool 14 has a tubular hub 42 that receives the bushings 32 and 34 in opposite ends thereof journalling same for rotation. Spaced inwardly from one end of the hub is a single radial flange 44 that cooperates with the adjacent end plate 22 to define an annular spring cavity 46. Within this cavity is coiled a spiral torsion spring 48 which has its outer extremity secured by fastener 50 to the spool housing while the inner end is reversely bent to form a hook 52 (FIGURE 2) adapted to hook into slot 54 in the hub. Spring 48 is pre-tensioned to wind all of belt 16 onto spool 14 yet permit the entire length of the belt to be run off before it is fully tensioned. In this manner, torsion spring 48 functions to automatically take up slack in the belt and also store the entire length thereof when not in use.

The opposite end of hub 42 carries a pair of radial flanges 56 and 58 arranged in axially-spaced parallel relation to one another as shown in FIGURE 1. The innermost flange of the two, 56, cooperates with single flange 44 to define a central annular belt cavity 60 located opposite slot 20 in the spool housing. In FIGURES 1, 4 and 5 it can be seen that hub 42 also contains an elongate slot 62 located between flanges 44 and 56 that is adapted to pass the end of the belt around axle 36. The belt is actually dead-ended on the axle by passing an end thereof through the slot 62 in the hub, around the axle and back out again through said hub slot to form a loop 64 that is stitched closed. The axle does not rotate but as the hub turns thereon, slot 62 progresses around the axle wrapping the belt onto said hub as shown in FIGURE 4.

In referring to FIGURES 1 and 3, it can be seen that the pair of radial flanges 56 and 58 on the opposite end of the hub from torsion spring 48, cooperate to form an annular outwardly opening radial groove 66 (FIGURE 1) within which are secured centrifugally-actuated locking pawl 68 and tension spring 70 that biases the latter into retracted or disengaged position. A pivot pin 72 bridges groove 66 with its axis in radially-spaced parallel relation to the spool axis. One end of pawl 68 is mounted on this pivot pin 72 for free pivotal movement. The opposite or free end of pawl 68 is normally biased inwardly against stop pin 74 by tension spring 70, one end of which is attached to eyelet 76 carried by the pawl while the other end is secured to spring mounting pin 78.

Now, the spool housing of the case is formed to provide an inwardly projecting peripheral series of punched teeth 80 arranged in substantially equi-angularly spaced relation around the outside of the annular groove 66 between the pair of flanges. These teeth are fabricated by punching rectangular tabs connected along one edge and severed along three edges from the wall of the spool housing to form in the nature of a peripheral ratchet. Pawl 68, on the other hand, constitutes a flyweight due to its eccentric mounting which, upon the application of sufficient centrifugal force, will move outward into contact with the spool housing overcoming the bias exerted thereon by tension spring 70. Note in connection with FIGURE 3 that it is only when the spool turns rapidly in a clockwise direction that pawl 68 will engage the teeth in a manner to stop the spool; whereas, rotation of the spool counterclockwise no matter what the speed will merely result in the pawl slipping past the teeth. Also, the spool is entirely free to turn clockwise so long as the speed of rotation is insufficient to cause the pawl to overcome the bias of the tension spring and engage one of the teeth. Thus, by winding the belt on the spool in the direction shown in FIGURE 4 and the spiral torsion spring in the opposite direction as revealed in FIGURE 2, the reel will be responsive to rapid pay-out of the belt to instantly lock the spool against further rotation. At the same time, slow pay-out of the belt will be insufficient to bring into play sufficient centrifugal force acting upon the eccentric pawl to overcome the bias of tension spring 70. As a result, the user is free to move around at will continually turning the spool in one direction or the other restrained only by the tension applied by torsion spring 48. Furthermore, no matter how fast the belt is allowed to wind up on the spool in response to the tension provided by the torsion spring, the ratchet and pawl assembly is inoperative to stop the spool.

Referring now to the modified configuration of the present invention as shown in FIGURES 7 through 10, wherein like parts are given like reference numerals, the reel generally designated by reference numeral 10a is substantially the same structure as set forth in FIGURE 1. The reel 10a includes a cylindrical case 12 containing spool 14 which is journalled on an axle 36. Longitudinally disposed on the case 12 is an elongated slot 20 which is positioned to allow the belt 16 to pay in and out on the spool 14. The cylindrical case 12 is closed at each end by means of end plates 22 and 22a which have L-shaped mounting feet 24 extending from one side. Each of the end plates 22 and 22a has a central opening 30 which accepts a flanged bushing 32 or 34. The bushings in turn receive the axle 36 which has a head 38 at one end and a nut 40 at the other. With the axle 36 in place the end plates 22 are secured to the ends of the spool housing completing the case 12.

The spool 14 has a tubular hub 42 which receives the shaft mounted bushings 32 and 34 at opposite ends and rotates thereon. Inwardly spaced from one end of the hub 42 is a radial flange 44, which together with the corresponding adjacent end plate 22 forms a spring cavity 46. Mounted within the cavity is a coiled torsion spring 48 which has its outer end attached by fastener 50 to the inside of the spool housing while the inner end of the spring is reversely bent in the form of a hook and fits into a slot 54 of the hub 42. The spring 48 is sufficiently pre-tensioned to automatically take up the slack in the belt and also store the entire length thereof when the belt is not in use.

Inwardly positioned from the opposite end of the hub 42 is a pair of radial flanges 56 and 58 which are arranged in axially-spaced parallel relation to one another as shown in FIGURE 7. The inner flnge 56 along with flange 44 forms the side margins of the belt cavity. The hub 42 also contains an elongated slot 62 extending between the flanges 44 and 56 that is adapted to receive the end of the belt 16. Mounted between the flanges 56 and 58 is a centrifugally-actuated locking pawl 68 which is similar in structure and operation to the pawl shown in FIGURE 1. When the centrifugal force exerted on the pawl exceeds the tension force in spring 70, the pawl will rotate outward into locking engagement with the ratchet teeth 80. When the spool 14 is rotated in a counterclockwise direction, the pawl slides over the teeth without engaging them.

Figure 8:
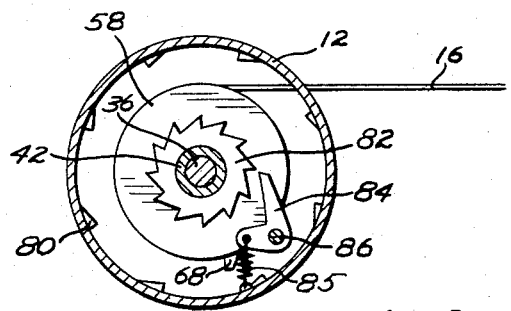
FIGURE 8 is a transverse section taken along lines 8—8 of FIGURE 7 showing the details of the secondary inertia-actuated locking pawl and its associated ratchet teeth.
Figure 10:
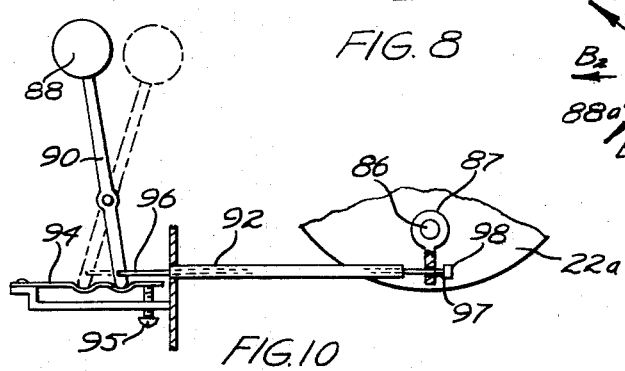
FIGURE 10 is a partial end view of the case, inertia weight, and the cable operator connecting the inertia weight and the inertia locking means.

Positioned on the hub 42 between outer flange 58 and the end plate 22a is a ratchet tooth gear 82 which is integrally attached to the hub 42 as best seen in FIGURE 8. Cooperating with the ratchet gear is an inertia actuated locking pawl 84 which is pivotally mounted to the end plate 22a by means of a mounting pin. The pin 86 is pivotally journalled through the plate 22a and mounted to its outer end is a small lever 87 as seen in FIGURE 10. Attached to the locking pawl 84 is a tension spring 85 which normally biases the pawl into locking engagement with the ratchet gear 82. The pawl 84 is normally held out of engagement with the ratchet gear by means of a flexible Bowden cable 92, which is attached to the lever 87 as seen in FIGURE 10. The sliding operator wire 96, within the cable freely passes through an opening 97 in the lever arm 87. The outer end of the wire 96 is formed with an enlarged portion 98 which will not pass through the opening 97. Connected to the opposite end of the operating cable 92 is a pivotally mounted lever 90. The operating wire 96 is attached to one end of the lever 90 while an inertia weight 88 with a mechanical advantage is mounted at the opposing end. When the weight 88 is in the dotted line position the operating wire 96 moves the lever 87 a sufficient angular distance that the pawl 84 is held out of engagement with the ratchet gear 82. When the weight is in the solid line position, the locking pawl is spring biased into engagement with the ratchet gear 82. The belt freely retracts in either position since the pawl will slide over the ratchet gear in a counterclockwise direction. When the vehicle to which the reel is mounted is subjected to a rapid deceleration in the nature of a crash or similar difficulty, the inertia effect upon the weight 88 causes it to continue moving in the same direction (from the dotted line position to the solid line position).

The locking pawl 84 acts as a secondary or safety locking means to the centrifugally actuated pawl 68. If the pawl 68 fails to lock or it releases prematurely, the secondary pawl 84 will keep the reel from releasing. For example, in the absence of a safety pawl, if there was a momentary slack in the belt the centrifugally actuated pawl 68 would release due to the tension spring 70. When the load was again exerted on the belt it would begin to unwind until the centrifugally actuated pawl 68 again locked the reel. It is conceivable that during the crash or rapid deceleration of a vehicle the belts of the harness would momentarily become slack numerous times before the vehicle came to rest. Under such circumstances the centrifugally actuated pawl would be substantially ineffective. With the inclusion of a secondary or safety pawl 84 the reel would not release during a momentary slack. Once the inertia weight 88 has moved to the locked position, the pawl 84 remains in locking engagement with the reel. The lever 90 is held in place by means of a two position detent spring 94, which engages the lower end of the lever 90. The spring 94 has an adjustable set screw 95 so that the G force necessary to release the lever can be varied for different requirements. The detent also functions to prevent any minor shock loads from causing the lever to move to the release position (dotted line position) after it has once locked.

The inertia weight 88 and associated linkage also serves as a manual locking means for the reel. When the weight is placed in the manual lock position, the belt 16 may freely rewind since the locking pawl 84 is spring biased and acts as a sliding ratchet when being retracted.

Figure 9:
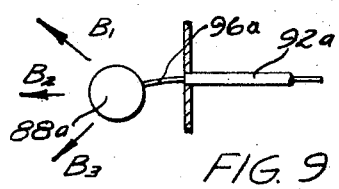
FIGURE 9 is a fragmentary section showing a modified configuration of the exterior mounted inertia weight shown in FIGURE 8.

Finally, with reference to FIGURE 9, a modified configuration of the inertia weight 88 of FIGURE 10 is illustrated. Weight 88a is directly attached to the flexible wire 96a within the cable 92a. The advantage of weight 88a over that shown in FIGURE 8 is that the impact force can come from various directions signified by the arrows $B_1$, $B_2$, and $B_3$, whereas the pivoted weight in FIGURE 8 can be impacted from only one direction (indicated by arrow A).

Having thus described the several useful and novel features of the combined inertia and centrifugally-actuated reel of the instant invention, it will be seen that the many worthwhile objectives for which it was designed have been achieved. Although but a single specific embodiment of the invention has been illustrated herein, I realize that certain changes and modifications may well occur to those skilled in the art within the broad teaching hereof; hence, it is my intention that the scope of protection afforded hereby shall be limited only insofar as said limitations are expressly set forth in the appended claims.

What is claimed is:

1. In a self-winding combined centrifugally and inertia-actuated belt storage reel, a case including a hollow open-ended cylindrical spool housing having an elongate belt slot intermediate the ends thereof and disk-like end plates covering both ends, said spool housing also having an inwardly-extending peripherally arranged series of ratchet teeth located adjacent one end thereof in angularly spaced relation to one another, an axle interconnecting the end plates in substantially coaxial relation to the spool housing, a spool mounted for rotation on the axle, said spool having a tubular hub freely rotatable on said axle and including an elongate slot adapted to receive a looped end of a belt encircling said axle, said spool also having a pair of radial flanges depending from the hub arranged in spaced parallel relation to one another to define an annular groove therebetween opening onto the series of peripherally arranged ratchet teeth, a ratchet tooth gear coaxial mounted on the spool hub adjacent said pair of radial flanges, first pawl locking means pivotally attached to one of said end plates positioned radially from said ratchet gear and adapted to lockingly engage said gear, inertia weight means, cable operating means connecting said inertia weight with said first pawl means adapted to lock said gear upon movement of said inertia weight, and said spool further including a single radial flange depending from the opposite end thereof cooperating with the adjacent end plate and the spool housing to form a spring cavity, a belt having one end attached to the axle and the other end passing out of the spool housing through the elongate slot therein, second pawl locking means pivotally attached at one end thereof between the pair of flanges on the spool for movement under the influence of centrifugal forces imparted thereto by rotation of said spool in one direction into locked engagement with one of the ratchet teeth, spring means interconnecting the free end of the second pawl and spool operative to bias said second pawl into disengaged position until a pre-determined spool velocity is reached at which said second pawl overcomes said spring bias and moves into engaged position, spring means located in the spring cavity connected between the spool housing and spool, said spring being operative to turn said spool in the direction opposite to that at which the pawl means lock their respective ratchet teeth, and said spring being pre-tensioned so as to continuously wind the belt onto the spool.

2. The self-winding belt storage reel as set forth in claim 1 in which circumferentially-spaced portions of the edges on both ends of the spool housing are recessed leaving arcuate tongues therebetween and the peripheral edges of the end plates are similarly cut away to receive said tongues and form an interlocking case assembly.

3. The self-winding storage reel as set forth in claim 1, the inertia weight means comprises a pivotally mounted lever with a weight attached at one end and the cable operating means attached to the other end thereof.

4. The self-winding storage reel as set forth in claim 1 in which the inertia weight means includes an adjustable friction means which varies the G-force necessary to move said inertia weight means.

5. The self-winding storage reel as set forth in claim 1, wherein said first locking pawl is normally spring biased into engagement with said ratchet gear, said cable operating means normally holding said first locking pawl out of engagement with said ratchet gear until movement of the inertia weight means.

6. The self-winding storage reel as set forth in claim 1 in which generally L-shaped legs are integrally formed with each of said end plates forming mounting brackets for the case.

References Cited by the Examiner

UNITED STATES PATENTS

| 2,708,966 | 5/1955 | Davis. | |
| 2,825,581 | 3/1958 | Knight | 242—107.4 X |
| 2,953,315 | 9/1960 | Lautier et al. | 242—107.4 |
| 2,990,131 | 6/1961 | Carlsson | 242—107.4 |

MERVIN STEIN, *Primary Examiner*.